April 9, 1968     M. MUCKLEY     3,376,695
EXHAUST FILTERS
Filed Jan. 6, 1966
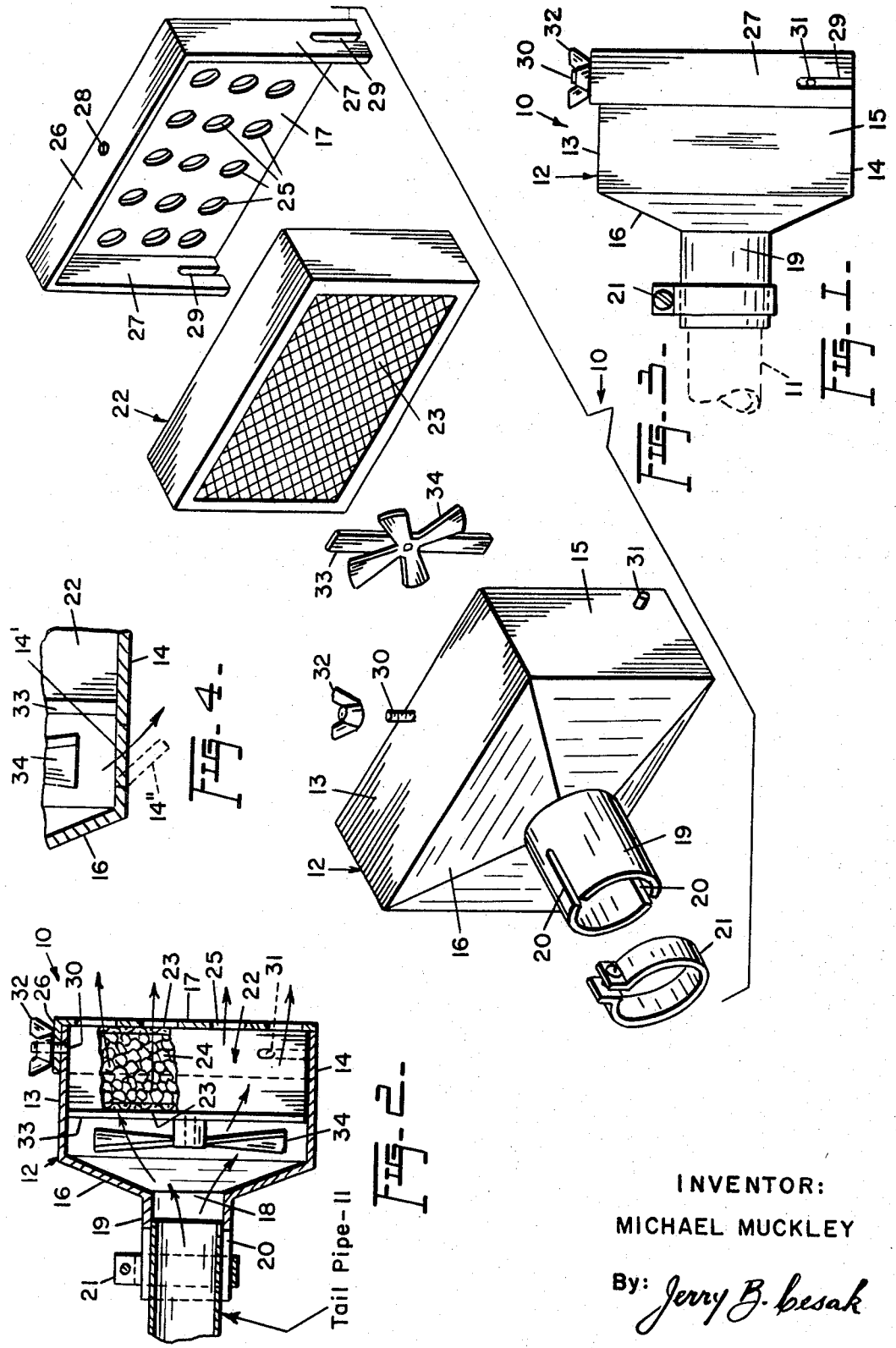
INVENTOR:
MICHAEL MUCKLEY
By: *Jerry B. Lesak*

United States Patent Office 3,376,695
Patented Apr. 9, 1968

3,376,695
EXHAUST FILTERS
Michael Muckley, % Crawford Industries Ltd.,
321 E. 48th St., New York, N.Y. 10017
Filed Jan. 6, 1966, Ser. No. 519,138
2 Claims. (Cl. 55—310)

ABSTRACT OF THE DISCLOSURE

A box-shaped housing attachable to the exhaust pipe of an internal combustion engine, the housing having an apertured removable cover plate and containing a replaceable filter cartridge of activated charcoal. A diffuser in the housing is rotated by flow of exhaust gases to agitate the same prior to their passage through the cartridge. The housing has a weakened portion rupturable by excessive exhaust gas pressure to by-pass the gases to the atmosphere when the cartridge becomes impervious to flow of gases therethrough.

---

This invention relates to new and useful improvements in the art of treating exhaust gases of internal combustion engines, and the principal object of the invention is to provide an exhaust filter which may be conveniently attached to the usual exhaust pipe or tail pipe of automobiles, trucks, buses, and the like, so as to filter exhaust gases discharged therefrom and thereby minimize pollution of the atmosphere.

As is well known, with the ever increasing number of automotive vehicles in operation, atmospheric pollution or smog caused by exhaust gases has become a significant problem in many parts of the country. In recognition of this problem, the present invention provides means for filtering the exhaust gases before they are discharged into the atmosphere, so that atmospheric pollution or contamination by the exhaust gases is substantially minimized.

As such, the exhaust filter of the invention comprises a housing which may be quickly and easily applied to the end of the tail pipe, together with a replaceable cartridge containing a filler of gas treating material such as activated charcoal, for example, the arrangement being such that exhaust gases entering the housing from the tail pipe must pass through the cartridge where obnoxious gas components are absorbed by the charcoal and relatively clean, filtered gases are discharged from the housing into the atmosphere.

Another important feature of the invention resides in the structural arrangement of the housing which permits the filter cartridge to be quickly and easily removed and replaced when necessary.

A further important feature involves the provision of a rotary diffuser in the housing, the diffuser being rotated by the flow of exhaust gases and serving to agitate and diffuse such gases prior to their passage through the filter cartridge, so that an efficient filtering action is obtained substantially uniformly over the cartridge area.

Still another important feature of the invention resides in the provision of means for by-passing exhaust gases from the housing directly to the atmosphere in instances where the filter cartridge has, through prolonged use, become impervious to passage of gases therethrough, such by-passing means preventing buildup of back pressure in the exhaust system and possible passible damage of its components.

The exhaust filter of the invention is simple in construction, easy to service, efficient in operation, and adapted to convenient and economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the exhaust filter of the invention in position at the end of a tail pipe shown by dotted lines;

FIGURE 2 is a view thereof, partly in longitudinal vertical section and partly in elevation;

FIGURE 3 is a group isometric view showing the components of the filter; and

FIGURE 4 is an enlarged, fragmentary sectional detail of the gas by-pass means.

Referring now to the accompanying drawings in detail, the exhaust filter of the invention is designated generally by the reference numeral 10 and is intended for filtering exhaust gases of internal combustion engines before such gases are discharged to the atmosphere. More particularly, the filter of the invention is adapted for use at the end of pipes or tail pipes of automobiles, trucks, buses and and like vehicles, the outlet end portion of such an exhaust pipe or tail pipe being indicated at 11.

The filter 10 comprises a substantially box-shaped housing 12, the main body of which includes a top 13, a bottom 14, a pair of sides 15 and a front wall 16, the housing having an open back which is covered by a removable cover plate 17 as will be hereinafter described.

The front wall 16 is preferably truncated as shown and formed with an inlet opening 18 for exhaust gases. A tubular adapter 19 is secured exteriorly to the front wall 16 in register with the opening 18, the adapter being longitudinally slotted as at 20 and receiving therein the end portion of the tail pipe 11, so that the entire filter may be mounted in position on the tail pipe by means of a suitable clamp 21, as will be clearly apparent.

A replaceable filter cartridge 22 is removably positioned in the rear portion of the housing 12, the cartridge consisting of a suitable casing having foraminous front and rear walls 23 and containing a filler of suitable exhaust gas treating material 24, as for example, activated charcoal. As such, the cartridge is readily pervious to passage of gas therethrough, during which obnoxious gas components become trapped and absorbed by the charcoal while relatively clean, filtered gas components are discharged from the cartridge and filter housing into the atmosphere.

The cartridge 22 is removably retained in position in the housing 12 by the aforementioned cover plate 17, the latter being provided with a plurality of openings 25 so that filtered gases may be discharged from the housing after passing through the cartridge. The plate 17 is formed with a top flange 26 and with a pair of side flanges 27, the flange 26 having a central aperture 28 while the side flanges 27 are provided in their lower end portions with vertical slots 29 open at their lower ends.

The top 13 of the housing 12 is equipped with an upstanding screw-threaded stud 30 for reception in the aperture 28 of the flange 26, while the sides 15 of the housing carry laterally outwardly projecting keeper pins 31 which are receivable in the slots 29 of the flanges 27. When the cover plate 17 is being applied to the housing 12, the flanges 27 are passed downwardly over the housing sides 15 so that the pins 31 are received in the slots 29, until the stud 30 enters the aperture 28 in the top flange 26 and the latter rests on the top 13 of the housing. The cover plate may then be secured in position by a wing nut 32 applied to the stud 30, as will be readily apparent. This procedure is reversed in removing the cover plate, and convenient access is thus obtained to the interior of the housing for purposes of inspection and/or replacement of the cartridge 22.

When the cartridge is inserted into the housing, the front of the cartridge abuts a vertical bar 33 which is rigidly secured in the housing and supports a rotatable diffuser such as a fan 34. As will be apparent, the fan 34 is disposed between the gas inlet 18 and the cartridge 22 and since it is rotated by the flow of gases through the housing, the fan effectively serves to agitate and diffuse the exhaust gases which enter the housing, so that such diffused and agitated gases are uniformly distributed over the whole area of the filter cartridge for an efficient filtering operation.

After prolonged periods of use, the filter cartridge may become blocked by accumulation of soot, carbon or other impurities, so that it is no longer readily pervious to passage of gases therethrough. On such occasions the cartridge should be replaced but if replacement is inadvertently overlooked, the blocked cartridge would cause a back pressure of gases to be built up in the housing 12 and in the exhaust system as a whole, with possible damage to its components. As a safeguard in this respect, the invention provides means for by-passing gases from the housing directly to the atmosphere, so that such gases do not need to flow through the filter cartridge.

As one example, such by-pass means may assume the form of weakened regions 14' provided in the portion of the housing bottom 14 upstream from the cartridge and below the fan 34 as shown in FIG. 4. These weakened areas or regions 14' are normally closed, but if due to blockage of the filter cartridge back pressure builds up in the housing to a point of danger, the weakened regions 14' will be opened by such back pressure as indicated at 14" to permit direct flow of exhaust gases from the housing to the atmosphere in by-pass of the filter cartridge. When the blocked condition is remedied by cartridge replacement, the housing regions 14' may be pressed back to their closed position.

As an alternative to the weakened housing regions 14', the bottom of the housing may be formed with openings covered by a gas pervious closure of a higher density than the filter cartridge, so that under normal conditions the gases flow through the cartridge but not through the high density closure which covers the by-pass openings. However, when the cartridge becomes blocked to a point where it is less pervious than the high density closure, a flow of gases through the by-pass openings would be possible to prevent a buildup of back pressure in the housing.

It may be also noted that when the engine is not in operation for some time, the charcoal in the filter cartridge will absorb moisture from the air. Then, upon starting of the engine, heat of the exhaust gases will evaporate such absorbed moisture and render the charcoal more efficient for its intended filtering purpose.

While the exhaust filter housing and cartridge have been shown and described as being rectangular in cross-section or box-shaped, they may alternatively be made circular in cross-section or cylindrical, if so preferred.

Thus, while in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. An exhaust filter for internal combustion engines, said filter comprising in combination a rectangular box-shaped housing having a top, a bottom, a pair of sides, a front wall formed with an opening constituting an inlet for exhaust gases to be filtered, and an open back, a longitudinally slotted tubular adapter provided exteriorly on said front wall in register with said opening for attachment of the housing to an exhaust pipe, an apertured cover plate removably mounted on said open back of the housing, the apertures of said cover plate constituting outlets for filtered gas, said cover plate being provided with a top flange and with a pair of side flanges overlying the top and sides of said housing respectively, means for removably retaining said cover plate in position on said housing, said retaining means comprising a pair of laterally outwardly projecting keeper pins provided on the sides of the housing adjacent the bottom thereof, said pins being received in open-ended vertical slots formed in bottom portions of the side flanges of the cover plate, and a fastener element provided on the top of said body, said fastener element being removably received in an aperture formed in the top flange of the cover plate, a transverse bar secured in said housing in rearwardly spaced relation from said front wall and forwardly spaced relation from said cover plate, a rectangular replaceable filter cartridge positioned in said housing between said transverse bar and the cover plate, said cartridge having foraminous front and rear walls with a filler of activated charcoal therebetween, and a rotatable diffuser mounted on said transverse bar between the latter and the front wall of the housing, said diffuser being rotatable by flow of exhaust gases through the housing and serving to agitate and diffuse the gases prior to their passage through said cartridge.

2. The device as defined in claim 1 wherein a portion of said housing forwardly of said transverse bar is weakened and outwardly rupturable by excessive pressure of exhaust gases for by-passing the gases to the atmosphere when said cartridge becomes substantially impervious to passage of gases therethrough.

References Cited

UNITED STATES PATENTS

| | | | |
|---|---|---|---|
| 1,373,280 | 2/1921 | Wells | 55—403 |
| 1,590,885 | 6/1926 | Burns et al. | 55—310 X |
| 1,695,554 | 12/1928 | Markels | 55—310 |
| 1,716,481 | 6/1929 | Bilsky | 23—2.2 |
| 1,867,323 | 7/1932 | Neville | 23—2.2 |
| 1,985,713 | 12/1934 | Bartlett | 23—2.2 X |
| 2,077,563 | 4/1937 | Henry. | |
| 2,314,986 | 3/1943 | Johnson | 55—407 |
| 2,327,181 | 8/1943 | Dunbar | 55—309 |
| 2,532,083 | 11/1950 | Brenner | 220—41 X |
| 2,607,437 | 8/1952 | Crawford et al. | 55—313 |
| 2,793,712 | 5/1957 | Graswich et al. | 55—404 |
| 2,796,950 | 6/1957 | Hersey | 55—302 X |
| 3,032,954 | 5/1962 | Racklyeft | 55—400 X |
| 3,224,171 | 12/1965 | Bowman | 55—313 X |

HARRY B. THORNTON, *Primary Examiner.*

D. TALBERT, *Assistant Examiner.*